Figure 1:
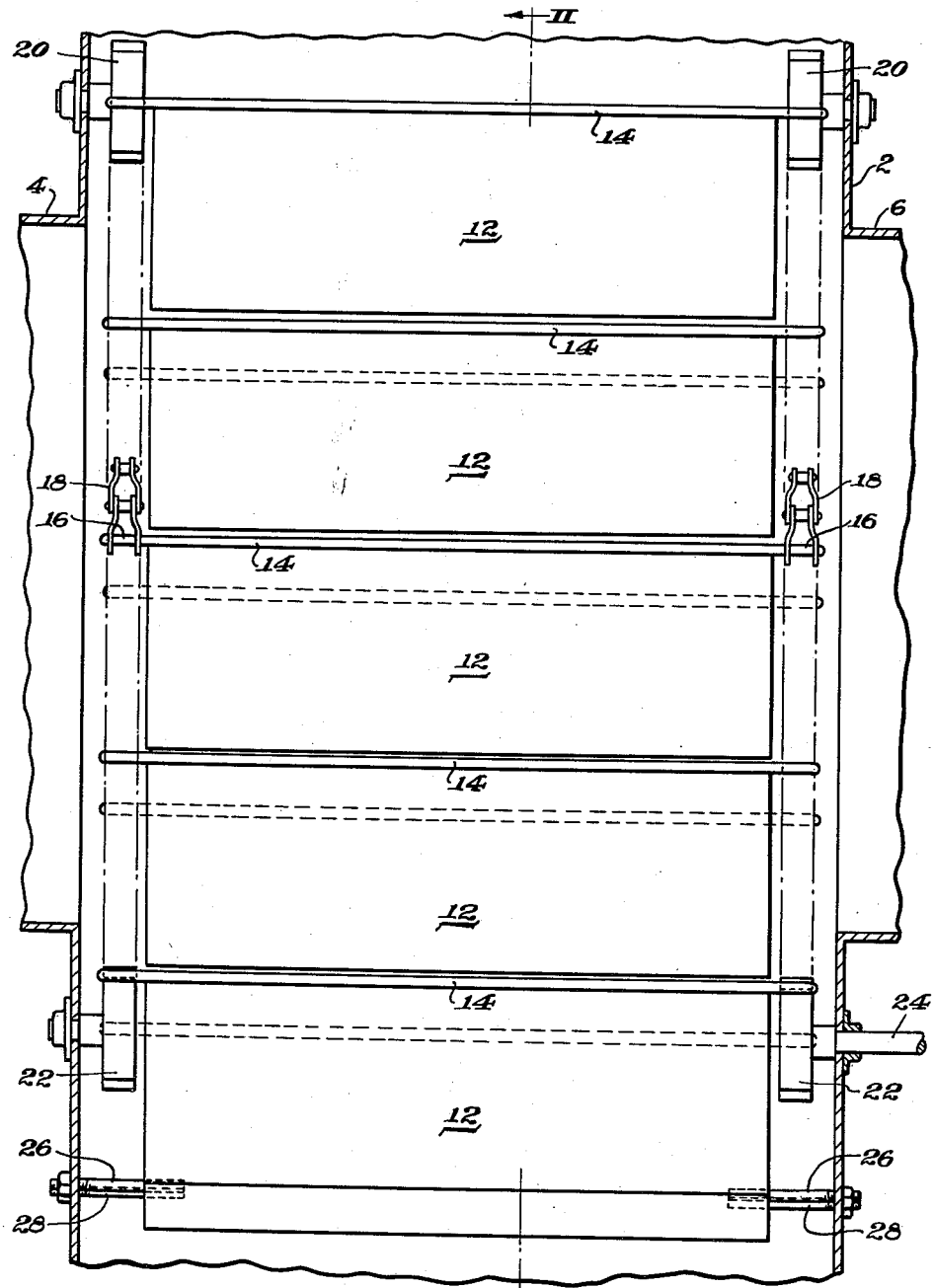

Jan. 13, 1953 J. H. ROPER 2,625,238
APPARATUS FOR ELECTRICAL PRECIPITATION
Filed July 12, 1947 2 SHEETS—SHEET 1

INVENTOR.
JOHN H. ROPER
BY
ATTORNEY.

INVENTOR.
JOHN H. ROPER.

Patented Jan. 13, 1953

2,625,238

UNITED STATES PATENT OFFICE 2,625,238

APPARATUS FOR ELECTRICAL PRECIPITATION

John H. Roper, Baltimore, Md., assignor to Koppers Company, Inc., Pittsburgh, Pa., a corporation of Delaware Application July 12, 1947, Serial No. 760,633

5 Claims. (Cl. 183—7)

This invention relates to improvements in apparatus for electrical precipitation and is particularly directed to improvements in methods and apparatus for precipitating solid particles such as fly-ash, dust and the like hereinafter referred to generally as dust from high temperature gases.

In the art of electrically precipitating dust from high temperature gases considerable difficulty has been encountered in removing the precipitated dust. Since the dust, which collects on the collecting electrodes, cannot be washed off in view of the high temperatures involved, it is the customary practice to provide some means for rapping the electrodes whereby the dust is dislodged therefrom. If the dust is removed in this manner without interrupting the operation of the precipitator, a considerable portion of the dust is redispersed in the gas stream. The new effect, therefore, is that some considerable portion of the work has to be done over.

It is an object of the present invention to provide improved apparatus for removing dust from high temperature gases by electrical precipitation. It is a particular object of the invention to eliminate or minimize redispersion of dust into the gas stream during dislodgment of the dust from collecting electrodes. Another object is to provide simple and economical apparatus for accomplishing this result. Another object is to reduce the size and weight required for a precipitator of specified capacity. Still other objects will appear as the description proceeds.

The objects are accomplished in the present invention by causing a dust laden gas to flow through a precipitation zone and causing the dust to be precipitated on both sides of a planar collecting electrode parallelly disposed in said precipitation zone, withdrawing dust-laden portions of said collecting electrodes from the precipitation zone, dislodging the dust therefrom and returning them to the precipitation zone, said withdrawal and return of said portions being so effected that the electrode surfaces in said precipitation zone are substantially continuous throughout the precipitation zone. Suitably, this is accomplished by causing the collecting electrodes to move in their planes transversely to the flow of gas whereby each electrode is displaced with reference to said precipitation zone. The dust is then removed from the outwardly displaced portion which is then returned to the opposite side to replace an inwardly displaced portion. By effecting the sequence as a continuous operation the electrode surfaces in said precipitation zone are substantially continuous throughout the zone and yet a portion is being continuously or periodically withdrawn so that dust may be dislodged therefrom without it being redispersed into the gas stream.

It has been proposed heretofore to provide self-cleaning electrodes by utilizing continuous belts for collecting the dust particles, but in the apparatus and processes heretofore available it has not been possible to effect precipitation on both sides of a planar collecting electrode. Thus, in U. S. Patent 1,822,074, it has been proposed to use a continuous belt to screen the collecting electrode and to remove the dust from the precipitation zone and in U. S. Patent 2,100,155 it has been proposed to use a continuous belt to present a continuous film of liquid for collecting dust and in U. S. Patent 1,869,335 it has been proposed to thread piano wire back and forth between parallel discharge electrodes to form continuously movable grid-like collecting electrodes. My invention has the advantage over these constructions that the collecting electrode always presents a substantially continuous plane surface to the discharge electrodes and that dust is collected on both sides of the collecting electrodes. The apparatus of my invention moreover are useful in handling large volumes of gas as is necessary in precipitating fly-ash from flue gas whereas these prior art structures would be of little, if any, value for this purpose.

In the treatment of flue gas it has also been proposed to use hollow electrodes and to withdraw the dislodged dust into such hollow electrodes, thereby to minimize the redispersion. It is not possible in such constructions to precipitate on both sides of the collecting electrode. Such precipitators, therefore, must be made undesirably wide to allow for the space between the collecting surfaces of the electrodes. This is a substantial factor, especially where a large number of collecting electrodes are arranged in a single unit. Consequently, while such structures are suitable for handling flue gas, they have the disadvantages of requiring more space and of being relatively heavy as compared with apparatus constructed according to the invention.

Figure 2:
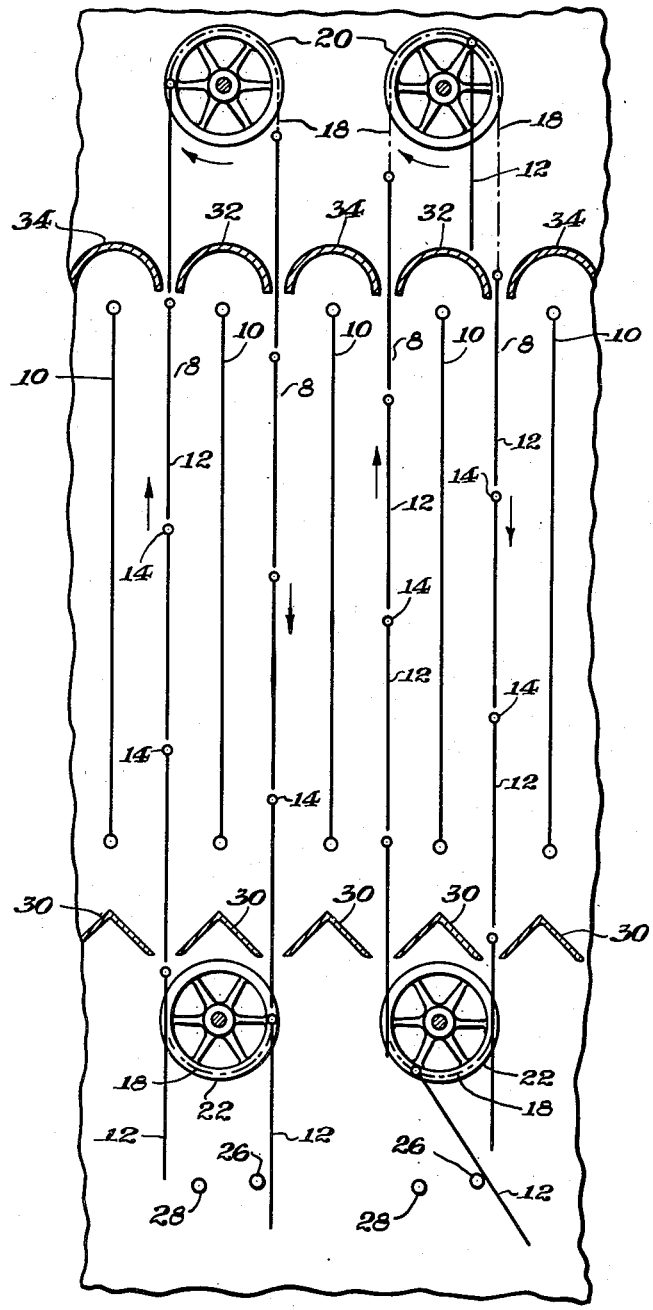

The following, taken with reference to the accompanying drawing, in which Figure 1 is a side elevation taken partly in section, and Figure 2 is a sectional view taken along lines II—II of Figure 1, is a detailed description of a particular embodiment of the invention. It will be understood, however, that the invention is not limited to the particularities of the embodiment about to be described and that the invention may be variously embodied without departing from the spirit and scope thereof as set forth herein and in the appended claims.

The precipitator elements are enclosed in the usual housing illustrated generally at 2, provided with inlet and outlet means 4 and 6 respectively for leading a gas to and from the precipitator unit. The housing 2 constitutes a complete gastight enclosure supported by suitable framework not shown. It may be provided with suitable dust collecting hoppers at the bottom in the usual manner.

Mounted within the housing 2 is a plurality of vertical planar collecting electrodes, each of which is parallel to each other and parallel to the direction of flow of gas from the inlet 4 to the outlet 6. The collecting electrodes 8 are uniformly spaced thereby providing a plurality of narrow passageways extending from the inlet 4 to the outlet 6 through which the gas passes in passing through the housing 2. In between each pair of collecting electrodes 8 there is disposed a suitable discharge electrode 10 with its elements midway between the two collecting electrodes and parallel thereto. Means not shown is provided whereby a high potential may be maintained across the discharge and collecting electrodes so that in the passage of dust-laden gas through the units the dust particles become charged and are caused to deposit on the collecting electrodes.

The collecting electrodes 8 are made up of a plurality of flat plates 12 suspended from rods 14. Rods 14 are provided with trunnions 16 extending beyond the plates 12 journaled in the endless chains 18 which ride over sprockets 20 and 22 so that one side of the chain rises vertically and the other side descends vertically. One or more of these sprockets may be provided with a driven shaft 24.

The rods 14 are supported by the chains 18 in a horizontal position so that each rod is parallel to each other rod. The plates 12 are of such dimensions that the space between the rods is substantially completely occupied by the plane surface of the plates 12. By locating the sprockets 20 above the precipitation zone and the sprockets 22 below the precipitation zone, there is provided throughout the precipitation zone a substantially continuous unbroken planar surface for the collection of the charged dust particles.

As the sprockets are rotated the plates 12 ascend on one side and descend on the other. As any one of the rods 14 ride over the upper sprockets 20, the plate it supports moves horizontally while still maintaining its vertical position from the plane of the ascending plates to the plane of the descending plates. It is in effect transferred from one collecting electrode to the adjacent one.

A similar transfer of plates from one electrode to another is effected as any one of the rods 14 rides under the bottom sprockets 22. In this case, however, a suitable detaining means such as the rods 26 are provided to prevent the plate from staying in the vertical position as it is transferred from one plane to the other. Thus, as more particularly shown in Figure 2, the bottom edge of the plate is held back while the top edge moves from one side to the other. When the plate is elevated sufficiently for its bottom edge to clear the retaining means 26, it swings over to assume a horizontal position. This swing is temporarily interrupted by a suitable obstruction such as the rods 28. The swinging plate strikes the rods 28 with sufficient force to dislodge the dust. As the plate continues to rise, it clears the obstruction 28 and again assumes the vertical position. It will be understood, however, that the rod 28, if desired, may be so located that the plate is already in the vertical position or even slightly past the vertical position, if desired, when it strikes. All that is required is that the obstruction be in the path of the swinging plate at some point where its kinetic energy is sufficient to provide a shock strong enough to dislodge the dust particles.

In order to confine the flow of gases to the precipitation zone, a series of baffle plates may be provided between the collecting electrodes at the top and bottom of the precipitation zone. These baffle plates may be variously shaped according to their particular location. Preferably, they are peaked in order to provide sloping sides so as to avoid excessive accumulations of dust. At the bottom and elsewhere where the shape is not critical, it is suitable to provide baffles as shown at 30 having flat sides, sloping to a peak. These baffles are spaced from each other sufficiently to provide a space for the rods 14 to pass and are spaced sufficiently from the discharge electrodes 10 to prevent arcing over. The baffles immediately beneath the upper sprockets 20 should be semicircular shape as shown at 32. The upper surface must be below the low side of the bottom edge of the plate 12 as it passes over from one plane to the other, and the bottom surface should be sufficiently spaced from the top of the discharge electrode 10 to prevent arcing over. The baffles 34 conveniently may be the same shape or they may be shaped as baffles 30.

While I have disclosed my invention with reference to a particular embodiment, it will be understood that it may be variously embodied and that various means may be utilized for withdrawing plate sections of collecting electrode from the precipitation zone, and for elevating them, after being cleaned, so that they may again be incorporated into one or another of the collecting electrodes. It will be understood that these and other variations are within the scope of the invention as described and as set forth in the appended claims.

I claim:

1. In an electrical precipitator the combination which comprises a housing, means including gas inlet and gas outlet means and upper and lower baffle means for directing the flow of gas horizontally through said housing, a vertical, planar collecting electrode disposed in said housing parallel to the plane of the direction of the flow of said gas, a discharge electrode operatively associated with said collecting electrode, and defining with said collecting electrode and said upper and lower baffle means a precipitation zone said collecting electrode being constituted of separate plates arranged one above the other in the plane of said electrode, means for causing said plates to move one after the other downwardly through said lower baffle means to a point below said precipitation zone, means for elevating said plates to a point above said upper baffle means and means for incorporating the elevated plates into said collecting electrode, said last named means and the means for elevating said plates being so correlated with the means for causing the plates to move downwardly through the precipitation zone as to provide a collecting electrode which has substantially continuous planar surfaces throughout the precipitation zone and means for dislodging dust from said plates while they are outside said precipitation zone.

2. The apparatus of claim 1 in which the plates are suspended from means journaled in endless chains arranged to cause the plates to ascend on one side of a discharge electrode and descend on the other side thereof.

3. The apparatus of claim 2 in which means is provided to hold back the bottom edge of each plate as it passes from one side to the other at the bottom in combination with means against which said plate may strike when it swings free of said holding means.

4. In an electrical precipitator the combination which comprises a housing, means for directing a flow of gas horizontally through said housing, a plurality of uniformly spaced, vertical, planar collecting electrodes disposed in said housing parallel to each other and to the plane of the direction of the flow of said gas, discharge electrodes operatively associated with each side of said collecting electrodes, and defining with said collecting electrodes a precipitation zone each of said collecting electrodes being constituted of separate plates arranged one above the other in the plane of said electrode, means for causing the plates in alternate collecting electrodes to move one after another downwardly through said precipitation zone to a point below said precipitation zone, means for causing the plates in the remaining collecting electrodes to move one after the other upwardly through said precipitation zone to a point above said precipitation zone, means above and below said precipitation zone for transferring plates from one collecting electrode to another, and means for dislodging dust from said plates while they are outside of said precipitation zone.

5. In an electrical precipitator the combination which comprises a housing, means for directing a flow of gas horizontally through said housing, a plurality of uniformly spaced, vertical, planar collecting electrodes disposed in said housing parallel to each other and to the plane of the direction of the flow of said gas, discharge electrodes operatively associated with each side of said collecting electrodes, and defining with said collecting electrodes a precipitation zone each of said collecting electrodes being constituted of separate plates arranged one above the other in the plane of said electrode, an endless chain means adapted to move a chain vertically in the plane of said collecting electrodes at each end thereof, means attached to the top edges of said plates for journalling said plates into said endless chain whereby vertical movement of said chain causes a vertical movement of said plates through said precipitation zone, said endless chain means above and below said precipitation zone being arranged to transfer said plates from one collecting electrode to another without rotating the said plates from their vertical position, and means interposed in the path of said plates below said precipitation zone to hold back the bottom edge of each plate as it passes from one collecting electrode to another in combination with means against which said plate strikes when it swings free from said holding means.

JOHN H. ROPER.

REFERENCES CITED

The following references are of record in the file of this patent:

UNITED STATES PATENTS

| Number | Name | Date |
| --- | --- | --- |
| 484,717 | Ince | Oct. 18, 1892 |

FOREIGN PATENTS

| Number | Country | Date |
| --- | --- | --- |
| 41,136 | Norway | July 8, 1924 |
| 163,477 | Switzerland | Jan. 29, 1932 |